(12) United States Patent
Mitchell (10) Patent No.: US 7,061,611 B2
(45) Date of Patent: Jun. 13, 2006

(54) REFRACTIVE RELAY SPECTROMETER

(75) Inventor: Thomas A. Mitchell, Nazareth, PA (US)

(73) Assignee: Wavefront Research, Inc., Bethlehem, PA (US)

(*) Notice: Subject to any disclaimer, the term of this patent is extended or adjusted under 35 U.S.C. 154(b) by 327 days.

(21) Appl. No.: 10/749,363

(22) Filed: Dec. 31, 2003

(65) Prior Publication Data

US 2004/0227940 A1    Nov. 18, 2004

Related U.S. Application Data

(60) Provisional application No. 60/437,564, filed on Dec. 31, 2002.

(51) Int. Cl.
*G01J 3/28* (2006.01)
*G01J 3/18* (2006.01)

(52) U.S. Cl. ..................................... 356/328

(58) Field of Classification Search .............. 356/326, 356/328

See application file for complete search history.

(56) References Cited

U.S. PATENT DOCUMENTS

| | | | |
|---|---|---|---|
| 3,748,015 A | 7/1973 | Offner | 350/55 |
| 5,717,487 A | 2/1998 | Davies | 356/328 |
| 6,078,048 A * | 6/2000 | Stevens et al. | 356/328 |
| 6,690,467 B1 * | 2/2004 | Reel | 356/328 |

OTHER PUBLICATIONS

NASA Contract No. NAS 7-918 Technical Support Package on "Low Distortion Imaging Spectrometers" for NASA Tech Brief, vol. 23, No. 3, Mar. 1999.
W. J. Smith. (1990) Modern Optical Engineering, 2$^{nd}$ Ed. New York: McGraw Hill Book Co. p. 372.
W. J. Smith (1992) Modern Lens Design. New York: McGraw Hill Book Co., p. 169.

(Continued)

*Primary Examiner*—F. L. Evans
(74) *Attorney, Agent, or Firm*—Burns & Levinson LLP; Jacob N. Erlich; Orlando Lopez (57) ABSTRACT

A compact spectrometer that is relatively free of spatial and spectral image distortions. The spectrometer includes one or more slit elements located at an object plane, a first optical sub-system having at least one refractive optical element, one or more dispersive elements located substantially at a center plane, a second optical sub-system having at least one refractive optical element, and one or more one detecting elements located at substantially an image plane. The first optical sub-system is capable of substantially collimating, at the center plane, electromagnetic radiation originating from the one or more slit elements. The second optical sub-system is, in one embodiment, substantially symmetric to said first optical sub-system, the center plane being the plane of symmetry. The second optical sub-system is capable of imaging the substantially collimated electromagnetic radiation from the center plane onto the image plane. Another embodiment has a reflective dispersive element, and the first optical sub-system is also the second optical sub-system, acting as a dual optical sub-system.

45 Claims, 10 Drawing Sheets

OTHER PUBLICATIONS

M. Laikin (2001) Lens Design, 3rd Ed. New York : Marcel Dekker, Inc. pp. 85, 169.

U.S. Appl. No. 60/437,564 filed Dec. 31, 2002. Applicant: Thomas A. Mitchell. Title: Refractive Relay Spectrometer.

* cited by examiner

REFRACTIVE RELAY SPECTROMETER

CROSS REFERENCE TO RELATED APPLICATIONS

This application claims priority of U.S. Provisional Application 60/437,564 filed on Dec. 31, 2002, which is incorporated by reference herein.

STATEMENT REGARDING FEDERALLY SPONSORED RESEARCH OR DEVELOPMENT

This invention was made partially with U.S. Government support from the Air Force Research Lab under Contract No. F33615-99-C-1410. The U.S. Government has certain rights in the invention.

BACKGROUND OF THE INVENTION

This invention relates generally to spectrometers, and, more particularly, to a novel spectrometer design based on refractive optical relay systems, which is more compact in physical size and superior in spectral imaging quality than previous designs.

A spectrometer is a known device that is commonly used to examine the spectral, or wavelength dependent, content of light. Light emitted or reflected by a given object or scene is imaged by some means onto the entrance of the spectrometer, usually a slit element that transmits a single line image from the object or scene. The spectrometer in turn re-images this light to another location while dispersing this light according to its wavelength in a direction orthogonal to the orientation of the slit element, where it can readily be observed or recorded.

Because every material has a unique spectral signature, the spectrometer has become a very useful scientific tool in a broad range of scientific and industrial applications including, but not limited to, the monitoring of regional and global environmental conditions, the identification of both airborne and terrestrial objects and surveillance applications, the assessment of unknown substances in forensic applications, the precise characterization of color spectra in colorimetry, and even in the assessment of crop health and irrigation scheduling in the farming industry.

Current optically fast spectrometer designs are either too large in size for many applications, including but not limited to, unmanned aircraft, and forensic fieldwork, or their dispersing elements are too complex and costly to fabricate for commercial applications, or they do not provide enough spatial and spectral imaging quality to meet the required system performance, or they cannot provide a combination of these characteristics simultaneously.

For example, consider some applications of hyperspectral imaging in which it is desirable to have a spectrometer that simultaneously possesses a large spectral bandwidth such as the combined visible, near infrared and short-wave infrared bands, a large spatial field so that a large ground area can be covered with a single fly-over, high spatial and spectral resolutions so that small spatial and spectral features can be resolved, negligible spectral and spatial distortions to facilitate recognition algorithms, a fast optical speed, a very small size and mass so that the system can be transported in an unmanned aerial vehicles (UAV) or be man-portable, and is readily manufacturable from low-cost components.

It is therefore an object of this invention to provide a spectrometer design that is compact in physical size.

It is a further object of this invention to provide a spectrometer design that is low in mass.

It is a further object of this invention to provide a spectrometer design that eliminates the need for complex and costly dispersing elements.

It is a further object of this invention to provide a spectrometer design that provides a high degree of spatial and spectral image quality that is relatively free of spatial and spectral image distortions.

It is a further object of this invention to provide a spectrometer design that provides large spatial and spectral fields.

It is a further object of this invention to provide a spectrometer design that operates over multiple bands of wavelength, forming a separate spectral image for each band or a single extended multi-band image.

It is a further object of this invention to provide a spectrometer design that simultaneously provides a dispersed spectral image and a polychromatic image.

It is a further object of this invention to provide a spectrometer design that simultaneously provides separate spectral images for multiple input scenes.

It is a still further object of this invention to provide a spectrometer design that provides a combination of the characteristics described above with superior trade-offs than have been previously attainable.

SUMMARY OF THE INVENTION

The objects set forth above as well as further and other objects and advantages of the present invention are achieved by the embodiments of the invention described hereinbelow.

The symmetrical principle (described in Warren J. Smith, "Modern Optical Engineering", Second Edition, McGraw Hill Book Co., N.Y., N.Y., 1990, p. 372) states that for an optical system that is completely symmetric about the optical stop, all transverse aberrations including coma, distortion, and lateral color are identically zero. Even for systems that deviate slightly from perfect symmetry, these aberrations are greatly reduced. A slight deviation may be considered any deviation whereby the lateral aberration contribution from one side of the optical stop substantially corrects the lateral aberration contribution from the other side of the optical stop. Unity magnification symmetric refractive relays make use of this symmetrical principle, and have been widely used in photocopiers, rifle sights, and periscope systems. A spectrometer design based on a symmetric refractive relay system can take advantage of this principle, where the elimination of distortion and lateral color aberrations in particular contribute to the reduction of spectral smile and keystone distortions.

Reflective spectrometer design forms, like the well-recognized Offner configuration, suffer from the size constraints inherent to the prevention of beam obscuration. Each reflective element must be positioned to avoid blocking the light reflected by another element, which causes the elements to be more spatially separated than in a similar refractive system.

Furthermore, current optically fast and physically compact spectrometer design forms, like the well recognized Offner and Dyson configurations, require curved dispersion elements. These can be very difficult and costly to build, particularly in the long-wave infrared wavelengths (8 to 12 micrometers). The present invention eliminates the requirement for a curved dispersion element, making use of plane dispersing elements including, but not limited to, simple planar blazed ruled diffraction gratings and holographic transmission gratings.

Prior art uses a telescopic imaging lens, or more specifically, a telephoto lens system used in a double-pass configuration. A telephoto lens is a well known optical system in the art (see, for example, Warren J. Smith, "Modern Lens Design", McGraw Hill Book Co., N.Y., N.Y., 1992, p. 169 and Milton Laikin, "Lens Design", Third Edition, Marcel Dekker Inc., N.Y., N.Y., 2001, p. 85) and can be classified as a lens system whose overall length is less than its effective focal length. Furthermore, and in general, a telescopic lens can be defined as a lens system that images a distant object, often located an infinite distance away from the lens, with a relatively high degree of magnification. A relay lens system, in contrast, is also a well-known optical system in the art (see Milton Laikin, "Lens Design", Third Edition, Marcel Dekker Inc., N.Y., N.Y., 2001, p. 169) and can be classified as a lens system that images an object with a relatively small degree of magnification, often at a value of unity.

While previous spectrometer designs have been shown to use a standard photographic telephoto camera lens in a double pass configuration, they do not take full advantage of the natural transverse aberration correction of coma, distortion, and lateral color that a spectrometer design based on a symmetric relay lens system can provide. This natural transverse aberration correction in conjunction with the compact nature of refractive systems and the elimination of curved dispersing elements makes refractive relay spectrometers of the present invention more compact and less costly than current designs, while providing superior spatial and spectral image quality.

For a better understanding of the present invention, together with other and further objects thereof, reference is made to the accompanying drawings and detailed description and its scope will be pointed out in the appended claims.

DETAILED DESCRIPTION OF THE INVENTION

Figure 1:
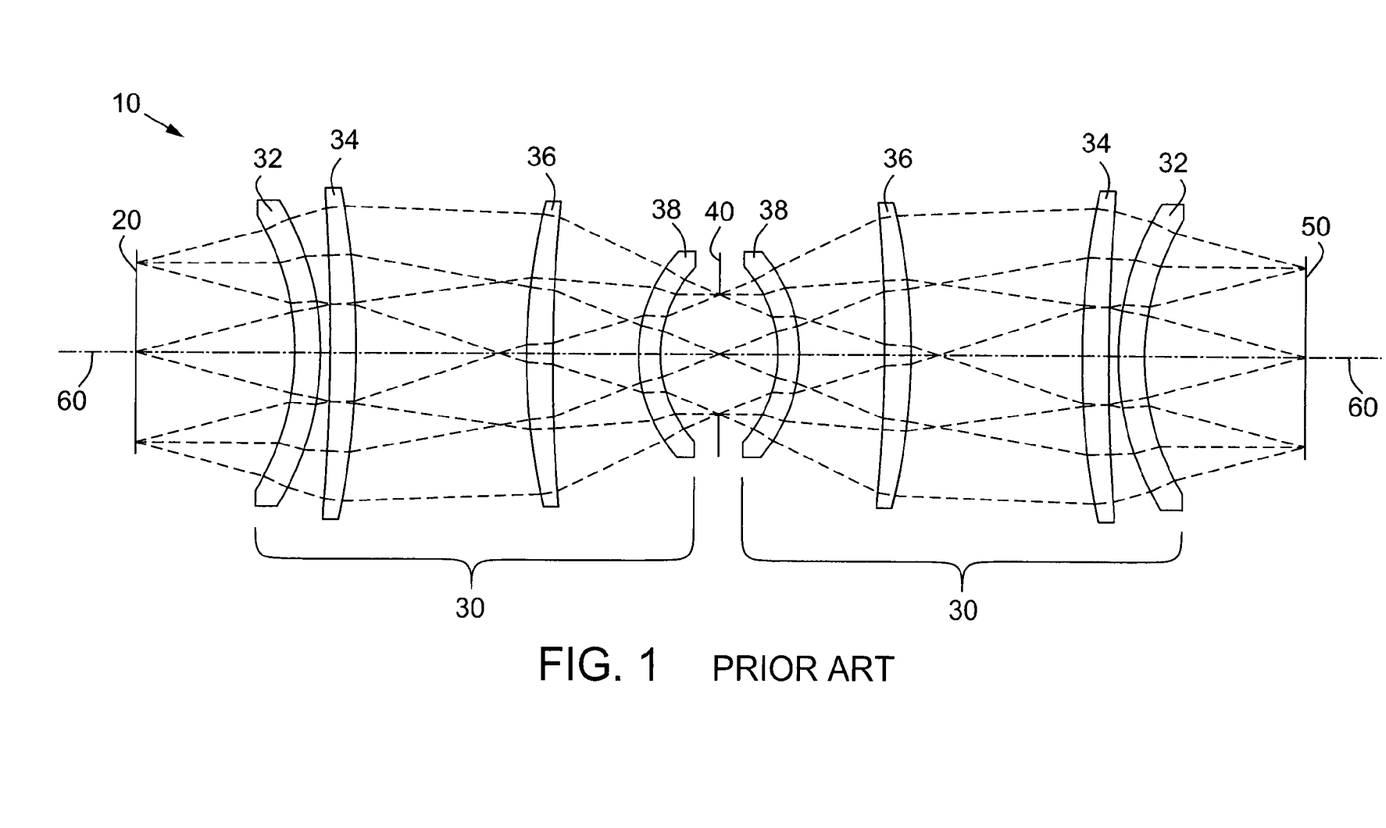
FIG. 1 is a schematic sectional view of a symmetric refractive relay imaging system in accordance with prior art.

Reference is made to FIG. 1, which represents a symmetric refractive relay imaging system 10, the principles of which are well known in the art. Electromagnetic radiation, typically in the ultraviolet, visible, and/or infrared bands, hereinafter referred to generally as light, emitted or reflected by a given object, either real or virtual, located at the object plane 20 is re-imaged with unity magnification to the image plane 50 through an optical system that is symmetric about the plane containing the optical stop 40, comprised of identical but reversed optical subassemblies 30 each of which contain one or more refractive optical elements, in this embodiment made up of refractive elements 32, 34, 36, and 38.

The symmetry of these refractive relay systems 10 about the optical stop location 40 provides a natural correction of all transverse aberrations including coma, distortion and lateral color. This natural aberration correction can be exploited to produce a spectrometer design that is more compact, less expensive, and has higher performance than previous designs.

Figure 2A:
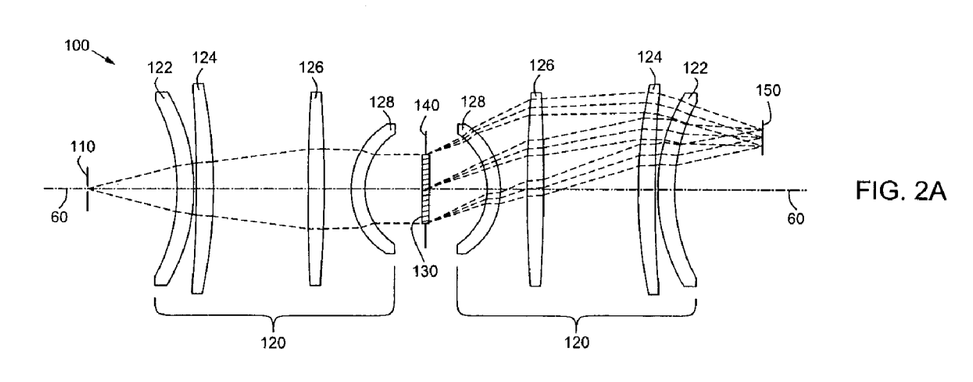
FIGS. 2A–2B are schematic sectional views of a symmetric refractive relay spectrometer in accordance with an embodiment of the present invention, taken along the optical axis in the plane parallel to the direction of dispersion (FIG. 2A) and in the plane perpendicular to the direction of dispersion (FIG. 2B)

Reference is made to FIG. 2A, which is a schematic sectional view of an embodiment of this invention 100, taken along the optical axis 60 in the plane parallel to the direction of dispersion. In operation, a transmitting dispersing element, the preferred embodiment of which is a volume holographic transmission diffraction grating, but in general is any method of angularly separating light energy according to its wavelength, hereinafter referred to generally as a dispersing element 130, is located at the optical stop location 140 (also referred to as a center plane) such that light emanating from the object position 110 (hereinafter also referred to as an object plane), typically a slit or other method of extracting a line image, hereinafter referred to generally as a slit element, is collimated or nearly collimated by the first optical subassembly 120 comprised of one or more refractive elements, in this embodiment made up of refractive elements 122, 124, 126, and 128, and diffracted by the dispersing element 130 at various angles according to wavelength. This dispersed light is imaged by the second optical subassembly 120, which is identical and reversed to the first optical subassembly 120, onto a location (hereinafter also referred to as an image plane) of a CCD array, phosphorescent screen, photographic film, microbolometer array, or other means of detecting light energy, hereinafter referred to generally as a detecting element 150.

Figure 2B:
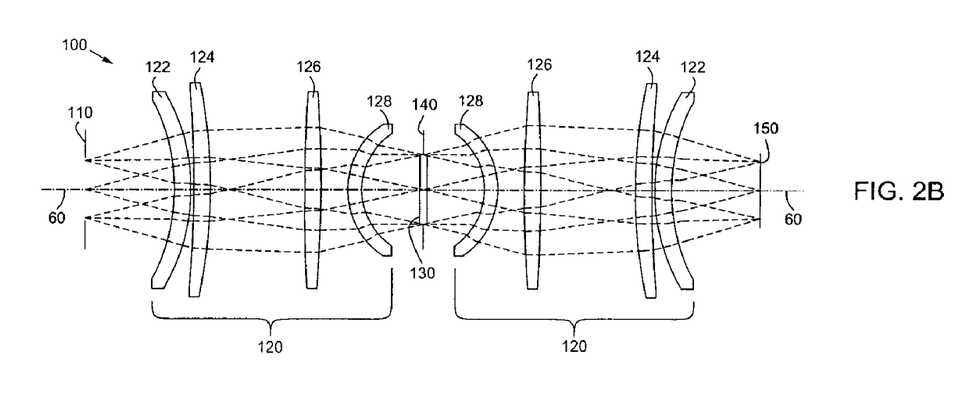

Reference is made to FIG. 2B, which is a schematic sectional view of this same embodiment 100, taken along the optical axis 60 in the plane perpendicular to the direction of dispersion. In operation, light emanating from the slit element 110 is imaged by the optical subassemblies 120 onto the detecting element 150 with, but not limited to, unity magnification, with a sufficiently broad and flat field over the entire extent of the image. In combination with the degree of spectral dispersion illustrated in FIG. 2A and the compact size of this embodiment, a spatial field of this extent is much wider than has heretofore been obtained.

Figure 3A:
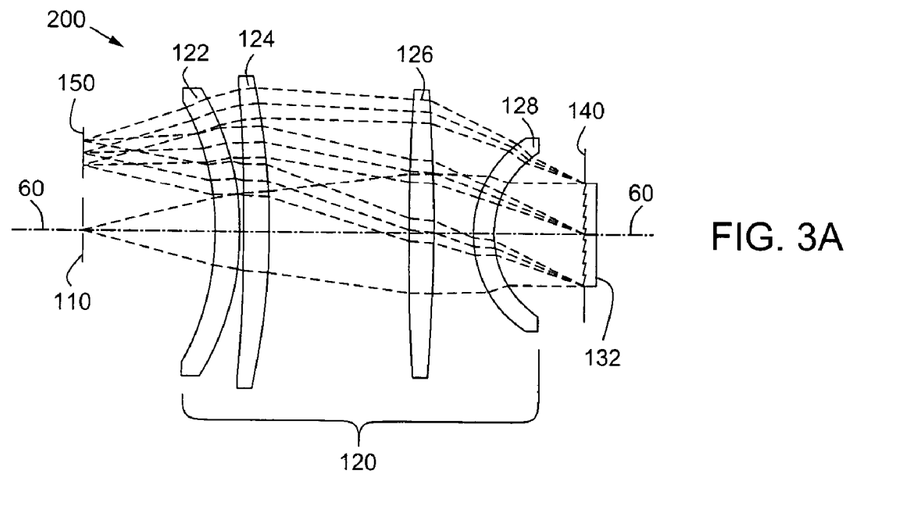
FIGS. 3A–3B are schematic sectional views of a folded refractive relay spectrometer in accordance with a further embodiment of the present invention, taken along the optical axis in the plane parallel to the direction of dispersion (FIG. 3A) and in the plane perpendicular to the direction of dispersion (FIG. 3B)

Reference is made to FIG. 3A, which is a schematic sectional view of a further embodiment of this invention 200, taken along the optical axis 60 in the plane parallel to the direction of dispersion, and illustrates a modification of the embodiment 100 where the transmitting dispersing element 130 is replaced by the reflecting dispersing element 135. Due to the symmetry of the refractive relay system about the optical stop 140, the first optical subassembly 120 serves also as the second optical subassembly. This allows the refractive relay to be folded over upon itself, which greatly reduces its overall size while still maintaining the natural transverse aberration correction of the refractive relay configuration.

Figure 3B:
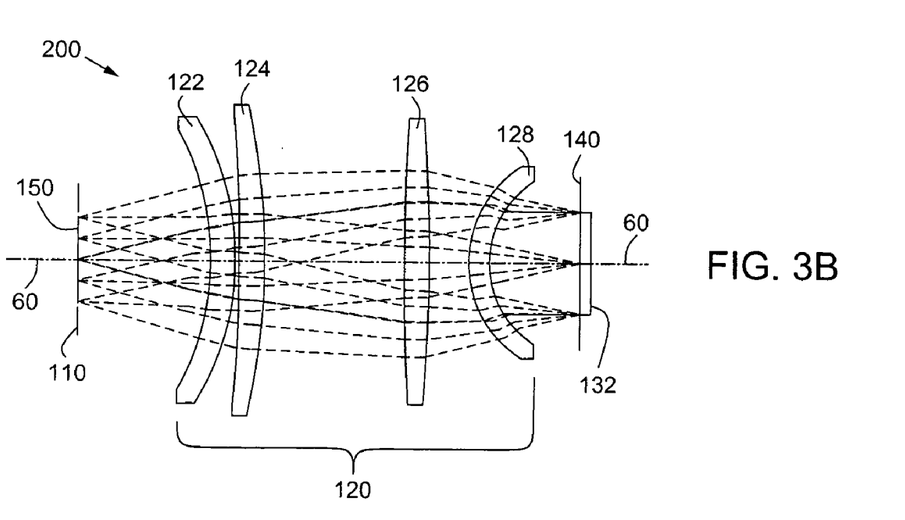

Reference is made to FIG. 3B, which is a schematic sectional view of this same embodiment 200, taken along the optical axis 60 in the plane perpendicular to the direction of dispersion. In operation, light emanating from the slit element 110 is imaged by the optical subassembly 120 onto the detecting element 150 with, but not limited to, unity magnification, with a sufficiently broad and flat field over the entire extent of the image. In combination with the degree of spectral dispersion illustrated in FIG. 3A and the compact size of this embodiment, a spatial field of this extent is also wide.

Figure 4A:
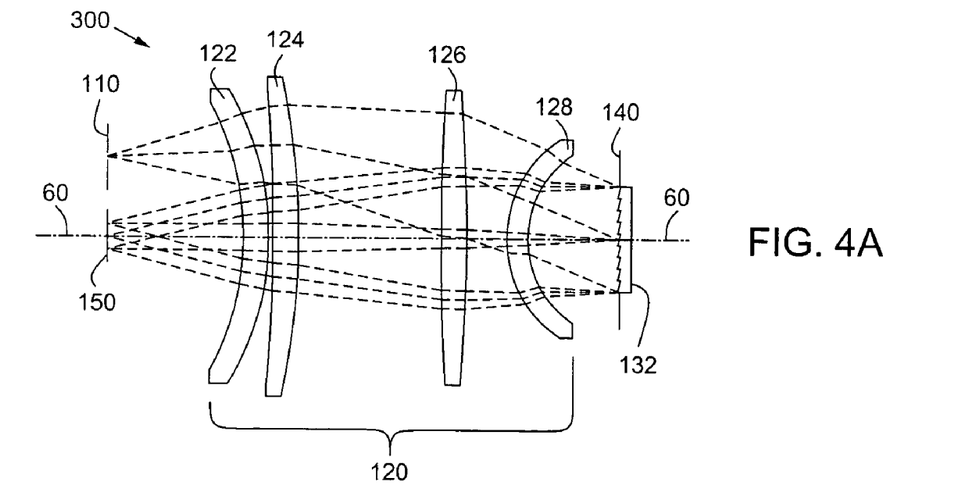
FIGS. 4A–4B are schematic sectional views of a folded refractive relay spectrometer with the object and image locations reversed in accordance with a further embodiment of the present invention, taken along the optical axis in the plane parallel to the direction of dispersion (FIG. 4A) and in the plane perpendicular to the direction of dispersion (FIG. 4B)

Reference is made to FIG. 4A, which is a schematic sectional view of a further embodiment of this invention 300, taken along the optical axis 60 in the plane parallel to the direction of dispersion, and illustrates a modification of the embodiment 200 where the location of the slit element 110 and the detecting element 150 are interchanged. (See, for comparison, FIGS. 2A and 3A in which the slit element 110 is located along the optical axis 60 and the detecting element 150 is located away from the optical axis 60.) In the embodiment shown in FIG. 4A, the detecting element 150 is located along the optical axis 60, reducing the required aperture diameters of the optical elements, thereby reducing the system size and mass.

Figure 4B:
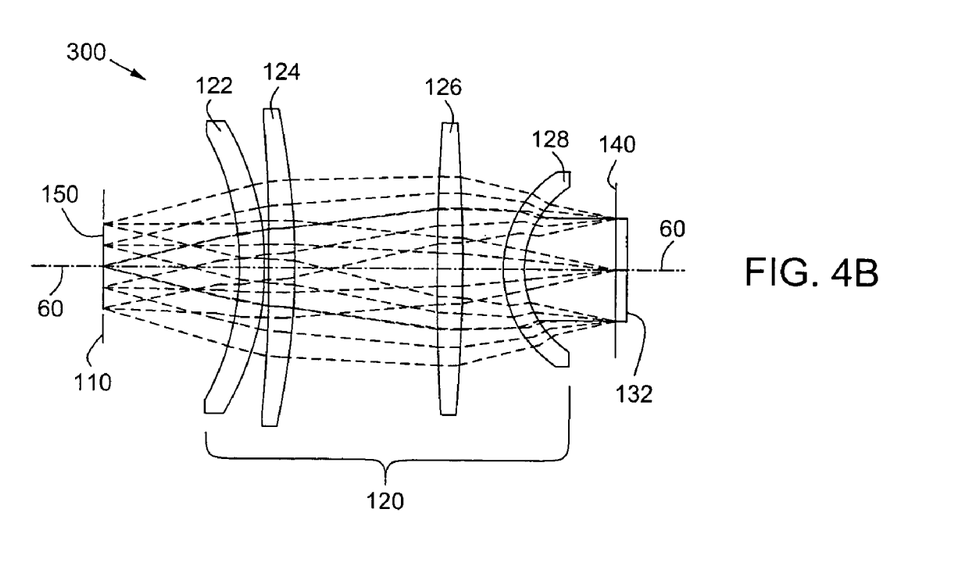

Reference is made to FIG. 4B, which is a schematic sectional view of this same embodiment 300, taken along the optical axis 60 in the plane perpendicular to the direction of dispersion. In operation, light emanating from the slit element 110 is imaged by the optical subassembly 120 onto the detecting element 150 with, but not limited to, unity magnification, with a sufficiently broad and flat field over the entire extent of the image. In combination with the degree of spectral dispersion illustrated in FIG. 4A and the compact size of this embodiment, a spatial field of this extent is also wide.

Figure 5A:
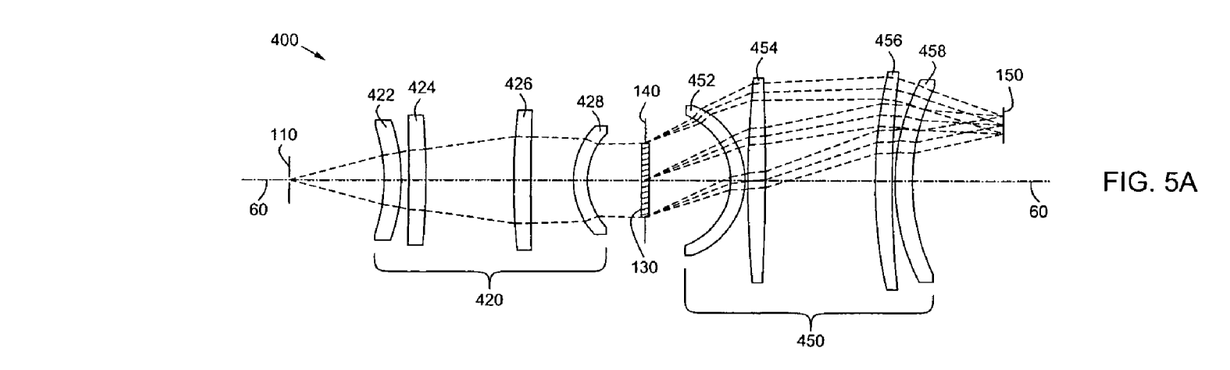
FIGS. 5A–5B are schematic sectional views of a further embodiment of the present invention based on the symmetric refractive relay spectrometer, taken along the optical axis in the plane parallel to the direction of dispersion (FIG. 5A) and in the plane perpendicular to the direction of dispersion (FIG. 5B)

Reference is made to FIG. 5A, which is a schematic sectional view of a further embodiment of this invention 400, taken along the optical axis 60 in the plane parallel to the direction of dispersion, and illustrates a modification of the embodiment 100 where the two symmetrical optical assemblies 120 are allowed to depart slightly from symmetry in order to optimize the system performance, resulting in the two modified optical subassemblies 420 and 450, in this embodiment made up of refractive elements 422, 424, 426, and 428, and 452, 454, 456, and 458 respectively. While the embodiment 400 does not appear obviously symmetric, by the symmetrical principle, this slight departure does not significantly affect the natural correction of the transverse aberrations including coma, distortion, and lateral color within the system, and since the symmetry of the optical ray paths is shifted somewhat by the diffraction element 130, the two optical subassemblies can be independently optimized to increase the performance of the overall optical system.

Figure 5B:
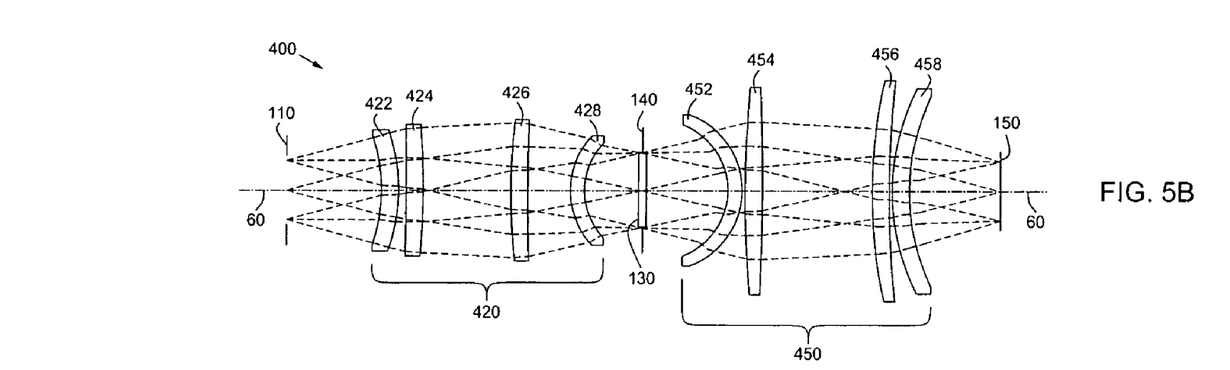

Reference is made to FIG. 5B, which is a schematic sectional view of this same embodiment 400, taken along the optical axis 60 in the plane perpendicular to the direction of dispersion. In operation, light emanating from the slit element 110 is imaged by the optical subassemblies 420 and 450 onto the detecting element 150 with, but not limited to, unity magnification, with a sufficiently broad and flat field over the entire extent of the image. In combination with the degree of spectral dispersion illustrated in FIG. 5A and the compact size of this embodiment, a spatial field of this extent is much wider than can be obtained in the prior art.

Figure 6A:
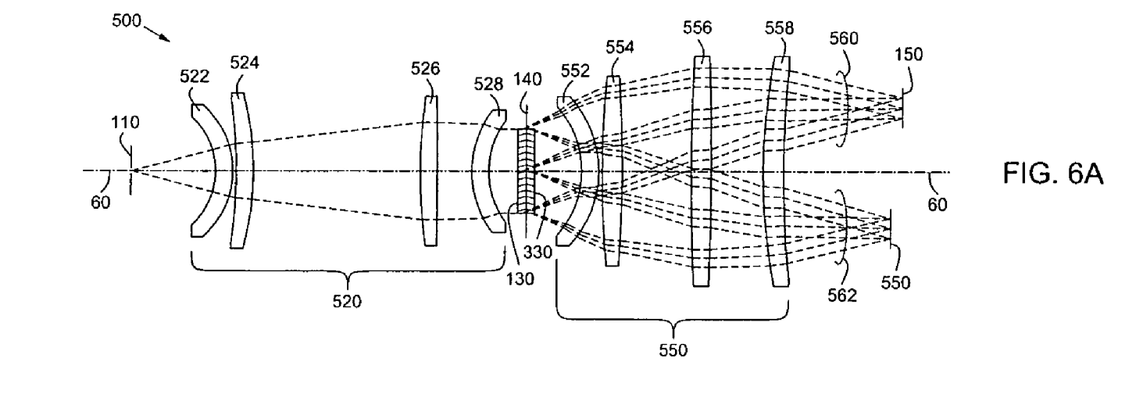
FIGS. 6A–6B are schematic sectional views of a dual spectral band refractive relay spectrometer in accordance with a further embodiment of the present invention, taken along the optical axis in the plane parallel to the direction of dispersion (FIG. 6A) and in the plane perpendicular to the direction of dispersion (FIG. 6B)

Reference is made to FIG. 6A, which is a schematic sectional view of a further embodiment of this invention 500, taken along the optical axis 60 in the plane parallel to the direction of dispersion, and illustrates a modification of the embodiment 400 where two separate spectral bands are dispersed over two detecting elements 150 and 152. A pair of dispersing elements 130 and 134 is collocated at the optical stop location 140. In operation, light emanating from the slit element 110 is collimated by the first optical subassembly 520 comprised of one or more refractive elements, in this embodiment made up of refractive elements 522, 524, 526, and 528, which optically transmits both of the desired spectral bands. The first spectral band is dispersed by the first dispersing element 130 at various angles according to wavelength and transmitted by the second dispersing element 330. This dispersed light is imaged by the second optical subassembly 550, in this embodiment made up of refractive elements 552, 554, 556, and 558, onto a detecting element 150. The second spectral band is transmitted by the first dispersing element 130 and dispersed by the second dispersing element 330 at various angles according to wavelength. This dispersed light is also imaged by the second optical subassembly 550 onto a separate detecting element 550. While the embodiment 500 does not appear obviously symmetric, by the symmetrical principle, this slight departure does not significantly affect the natural correction of the transverse aberrations including coma, distortion, and lateral color within the system. This embodiment provides many advantages including, but not limited to, the ability to replace two conventional single band spectrometers with a single dual band spectrometer, and an increase in throughput over a single broad band spectrometer since the diffraction efficiency obtained using two gratings each over half the spectrum is generally greater than that of a single grating over the entire spectrum. Detecting element 150 and 550 may also be implemented as a single, larger detecting element to reduce the cost associated with a second detecting element and the associated electronics.

Figure 6B:
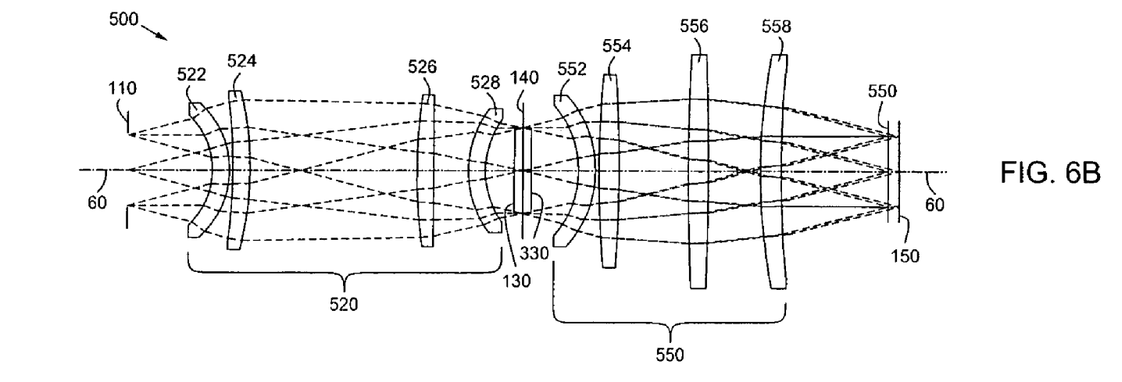

Reference is made to FIG. 6B, which is a schematic sectional view of this same embodiment 500, taken along the optical axis 60 in the plane perpendicular to the direction of dispersion. In operation, light emanating from the slit element 110 is imaged by the optical subassemblies 520 and 550 onto the detecting elements 150 and 550 with, but not limited to, unity magnification, with a sufficiently broad and flat field over the entire extent of the image. In combination with the degree of spectral dispersion illustrated in FIG. 6A and the compact size of this embodiment, a spatial field of this extent is also wide.

Figure 7A:
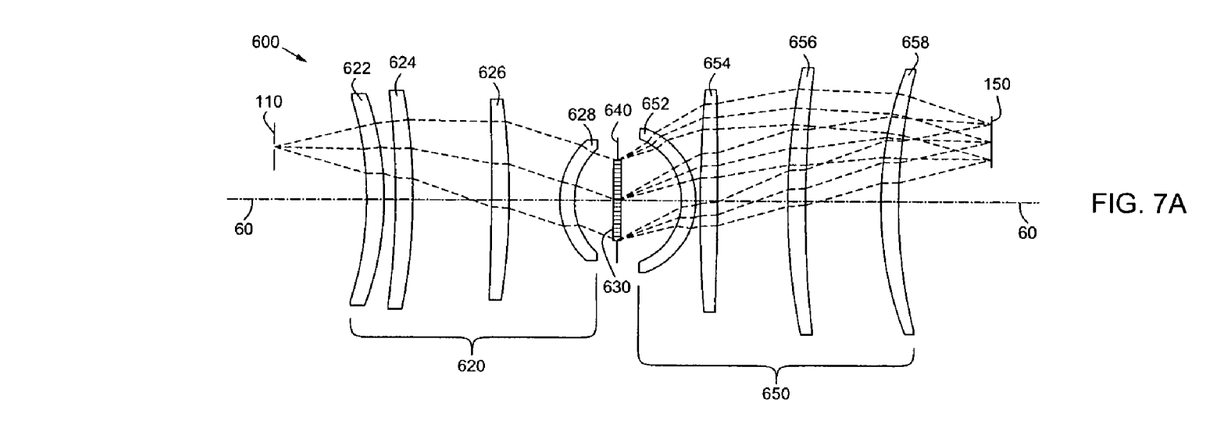
FIGS. 7A–7B are schematic sectional views of an off-axis refractive relay spectrometer in accordance with a further embodiment of the present invention, taken along the optical axis in the plane parallel to the direction of dispersion (FIG. 7A) and in the plane perpendicular to the direction of dispersion (FIG. 7B)

Reference is made to FIG. 7A, which is a schematic sectional view of a further embodiment of this invention 600, taken along the optical axis 60 in the plane parallel to the direction of dispersion, and illustrates a modification of the embodiment 400 where the location of the slit element 110 is displaced from the optical axis 60 in a direction parallel to the direction of dispersion. Light emanating from this displaced slit element 110 is collimated by the first optical subassembly 620 comprised of one or more refractive elements, in this embodiment made up of refractive elements 622, 624, 626, and 628, and diffracted by the dispersing element 630 at various angles according to wavelength. This dispersed light is imaged by the second optical subassembly 650 comprised of one or more refractive elements, in this embodiment made up of refractive elements 652, 654, 656, and 658, onto a detecting element 150. This embodiment provides many advantages including, but not limited to, a greater degree of symmetry that is re-introduced into the system which further contributes to the correction of transverse aberrations such as coma, distortion, and lateral color in the system, and also a greater degree of dispersion which is allowed to occur at the dispersing element 630 for the given system size.

Figure 7B:
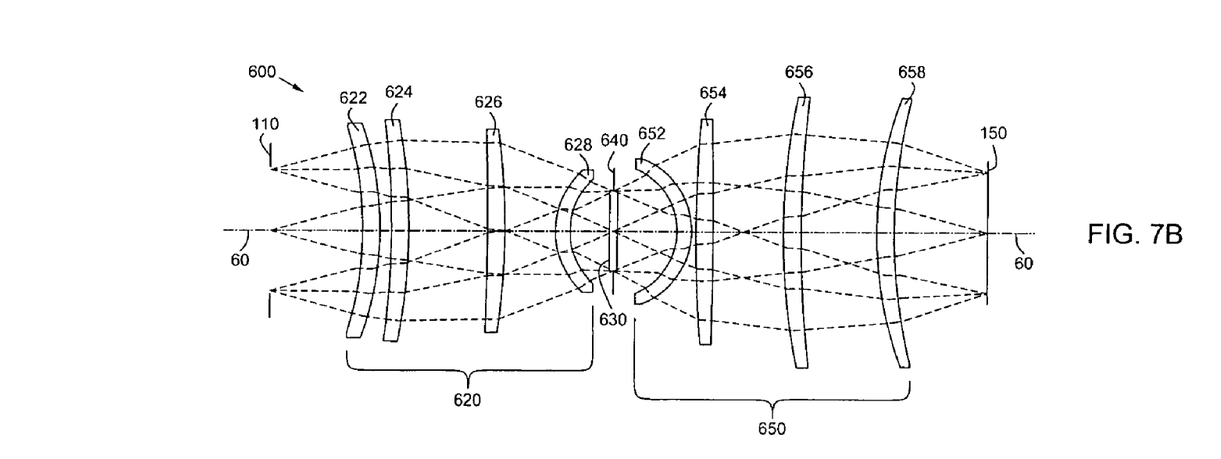

Reference is made to FIG. 7B, which is a schematic sectional view of this same embodiment 600, taken along the optical axis 60 in the plane perpendicular to the direction of dispersion. In operation, light emanating from the slit element 110 is imaged by the optical subassemblies 620 and 650 onto the detecting element 150 with, but not limited to, unity magnification, with a sufficiently broad and flat field over the entire extent of the image. In combination with the degree of spectral dispersion illustrated in FIG. 7A and the compact size of this embodiment, a spatial field of this extent is also wide.

Figure 8A:
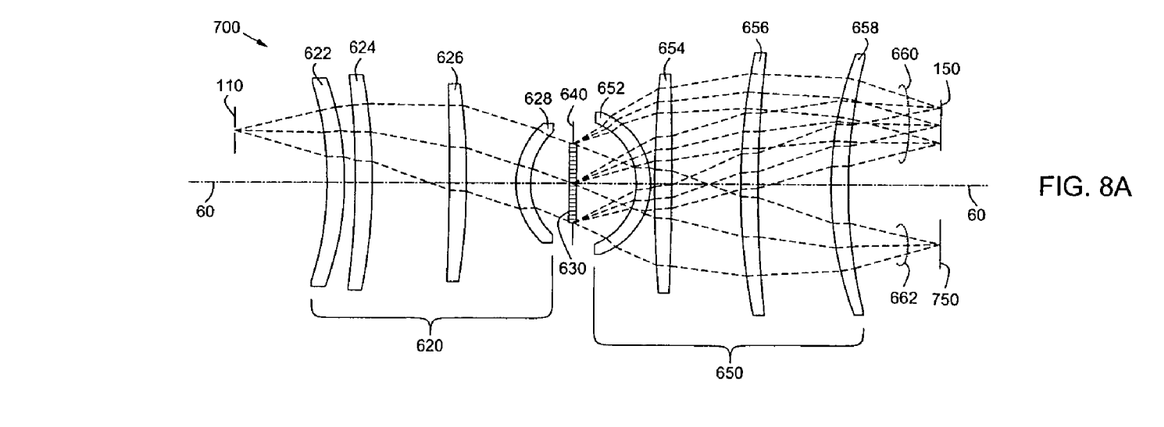
FIGS. 8A–8B are schematic sectional views of an off-axis refractive relay spectrometer with the addition of polychromatic imaging capabilities in accordance with a further embodiment of the present invention, taken along the optical axis in the plane parallel to the direction of dispersion (FIG. 8a) and in the plane perpendicular to the direction of dispersion (FIG. 8B)

Reference is made to FIG. 8A, which is a schematic sectional view of a further embodiment of this invention 700, taken along the optical axis 60 in the plane parallel to the direction of dispersion, and illustrates a modification of the embodiment 600 where the transmitting dispersing element 630 transmits some portion of the light without dispersing it at various angles according to wavelength. This non-dispersed light is imaged by the second optical subassembly 650 onto a detecting element 750. Detecting element 150 and 750 may also be implemented as a single, larger detecting element to reduce the cost associated with a second detecting element and the associated electronics.

Figure 8B:
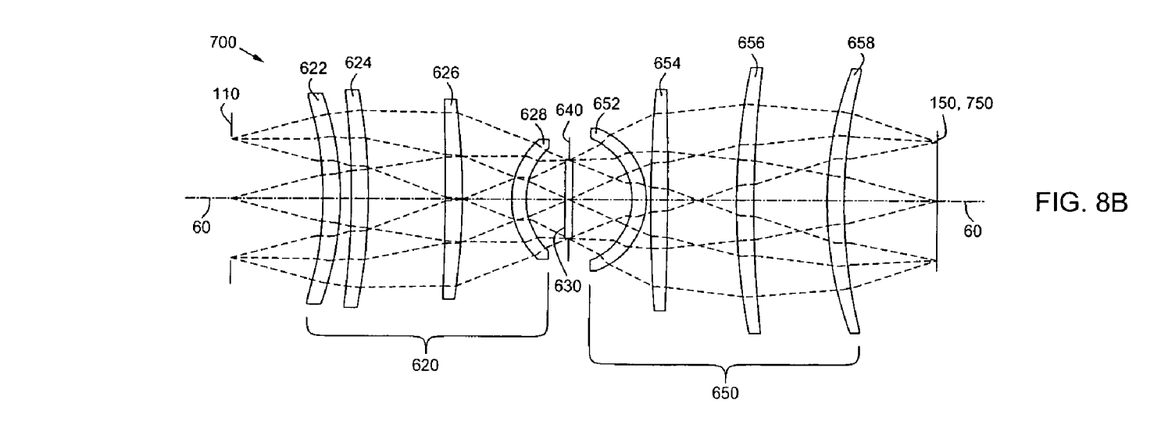

Reference is made to FIG. 8B, which is a schematic sectional view of this same embodiment 700, taken along the optical axis 60 in the plane perpendicular to the direction of dispersion. In operation, light emanating from the slit element 110 is imaged by the optical subassemblies 620 and 650 onto the detecting elements 150 and 750 with, but not limited to, unity magnification, with a sufficiently broad and flat field over the entire extent of the image. In combination with the degree of spectral dispersion illustrated in FIG. 8A and the compact size of this embodiment, a spatial field of this extent is also wide.

Figure 9A:
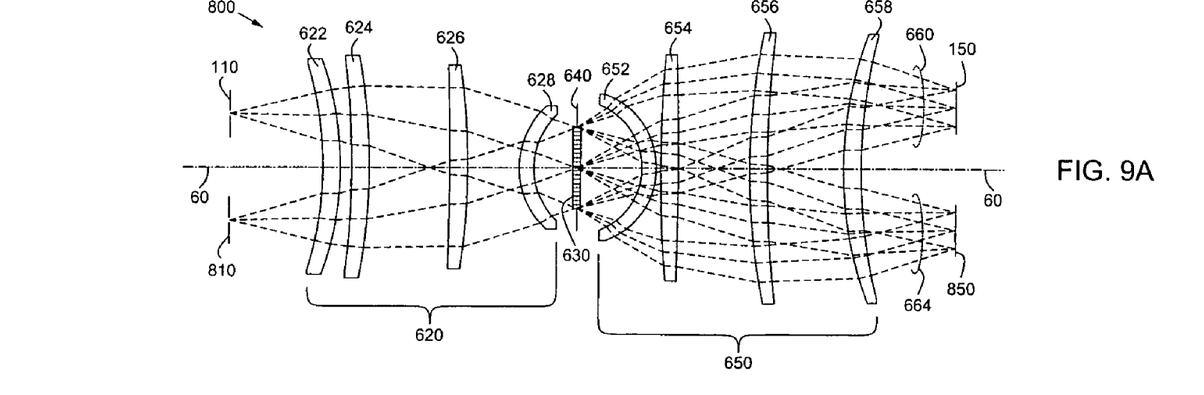
FIGS. 9A–9B are schematic sectional views of a dual refractive relay spectrometer in accordance with a still further embodiment of the present invention, taken along the optical axis in the plane parallel to the direction of dispersion (FIG. 9A) and in the plane perpendicular to the direction of dispersion (FIG. 9B)

Reference is made to FIG. 9A, which is a schematic sectional view of a still further embodiment of this invention 800, taken along the optical axis 60 in the plane parallel to the direction of dispersion, and illustrates a modification of the embodiment 600 where an additional slit element 810 is displaced from the optical axis 60 in a direction parallel to the direction of dispersion, but opposite that of the existing slit 110. Light emanating from this displaced slit element 810 is collimated by the first optical subassembly 620 comprised of one or more refractive elements, in this embodiment made up of refractive elements 622, 624, 626, and 628, and diffracted by the dispersing element 630 at various angles according to wavelength. This dispersed light is imaged by the second optical subassembly 650 comprised of one or more refractive elements, in this embodiment made up of refractive elements 652, 654, 656, and 658, onto a detecting element 850. Detecting element 150 and 850 may also be implemented as a single, larger detecting element to reduce the cost associated with a second detecting element and the associated electronics. Light emanating from the slit element 110 that is not diffracted by the dispersing element 630 will be imaged onto the opposing detecting element 850 as a single polychromatic line image that can be blocked with a single line stop. Similarly, light emanating from the slit element 810 that is not diffracted by the dispersing element 630 will be imaged onto the opposing detecting element 150 as a single polychromatic line image that can also be blocked with a single line stop. Alternatively, these polychromatic line images can be integrated across a scan to produce a polychromatic 2D image.

Figure 9B:
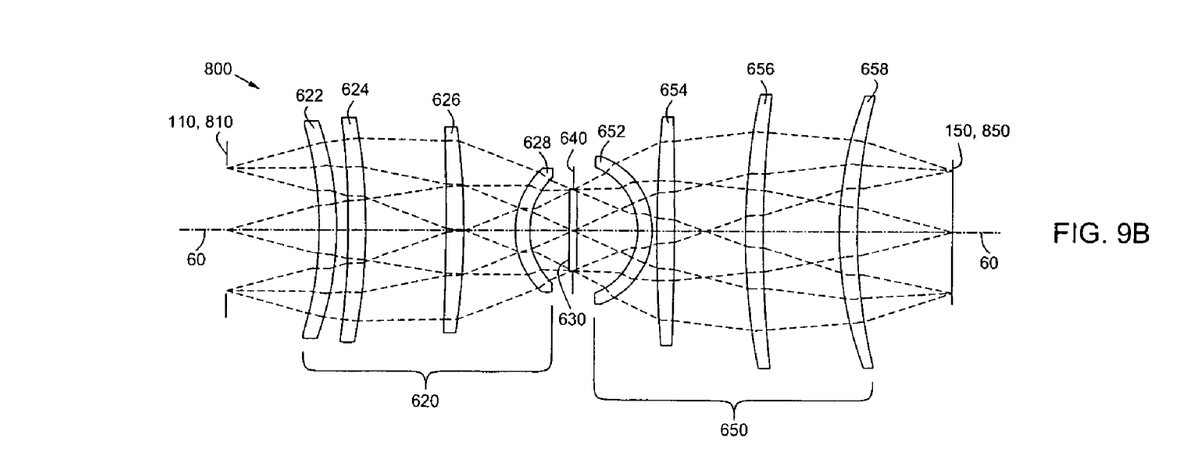

Reference is made to FIG. 9B, which is a schematic sectional view of this same embodiment 800, taken along the optical axis 60 in the plane perpendicular to the direction of dispersion. In operation, light emanating from the slit elements 110 and 810 are imaged by the optical subassemblies 620 and 650 onto the detecting elements 150 and 850 respectively with, but not limited to, unity magnification, with a sufficiently broad and flat field over the entire extent of the image. In combination with the degree of spectral dispersion illustrated in FIG. 9A and the compact size of this embodiment, a spatial field of this extent is much wider than can be obtained in the prior art.

Figure 10:
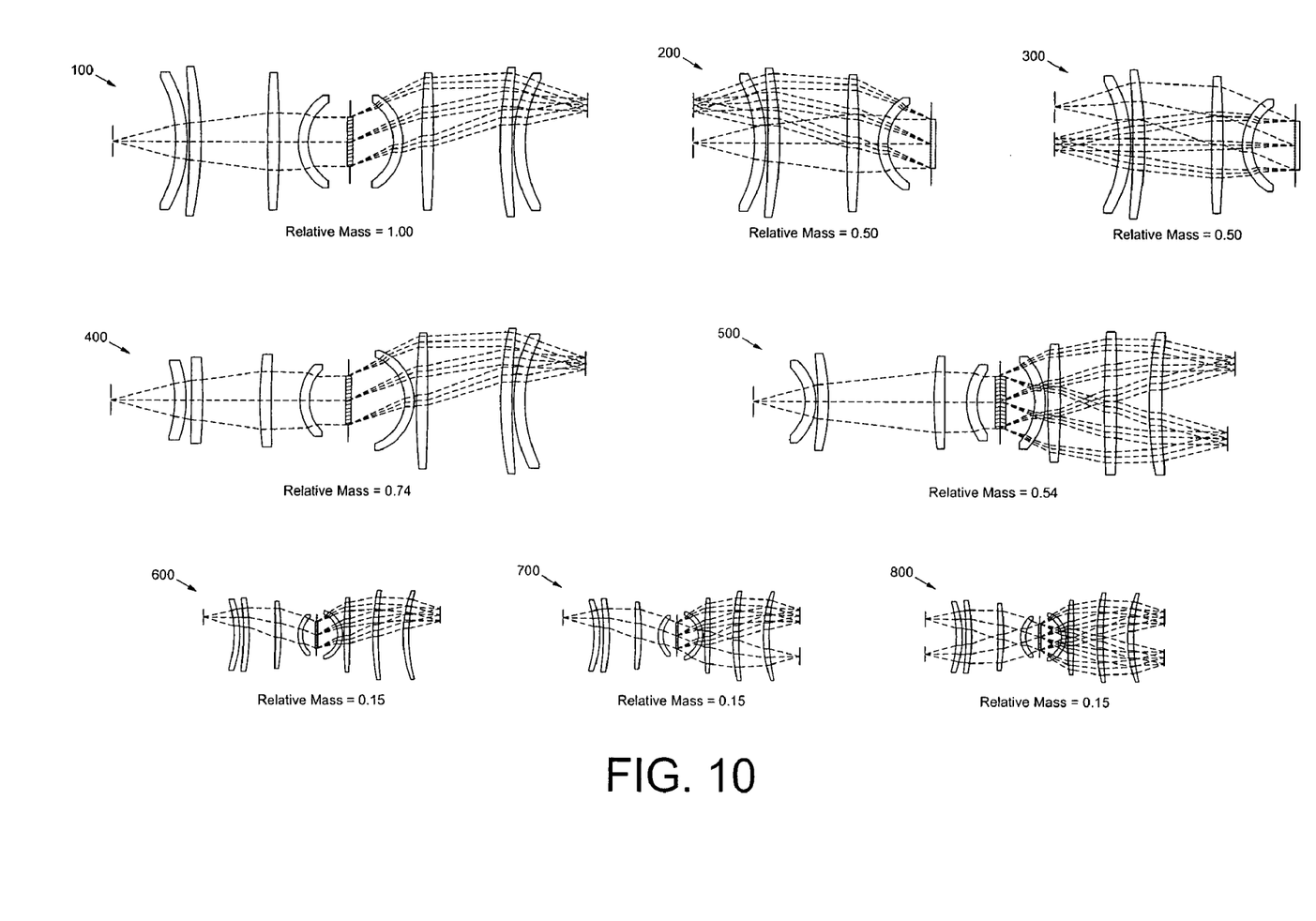
FIG. 10 provides a comparison of the relative physical sizes and masses of the embodiments of the present invention illustrated in FIGS. 2A, 3A, 4A, 5A, 6A, 7A, 8A, and 9A.

Reference is made to FIG. 10, which is a comparison of the relative physical sizes of the eight embodiments of this invention 100, 200, 300, 400, 500, 600, 700, and 800 illustrated in FIGS. 2A, 3A, 4A, 5A, 6A, 7A, 8A, and 9A respectively, all drawn to the same scale. The folded configurations of embodiments 200 and 300 reduces their overall size and mass by a factor of two, while the displaced slit configurations of embodiments 600, 700, and 800 reduces their overall length by approximately a factor of two and their overall mass and volume by approximately a factor of seven.

Although the invention has been described with respect to various embodiments, it should be realized this invention is also capable of a wide variety of further and other embodiments within the spirit and scope of the appended claims.

What is claimed is:

1. A spectrometer comprising:
at least one slit element located at an object plane;
a first optical sub-system having at least one refractive optical element;

said first optical sub-system being capable of substantially collimating, at a center plane, electromagnetic radiation emanating from said at least one slit element;

at least one dispersive element located substantially at the center plane;

a second optical sub-system having at least one refractive optical element;

said second optical sub-system and said first optical sub-system being designed substantially according to a symmetrical principle, the center plane being the plane of symmetry;

said second optical sub-system being capable of imaging the substantially collimated electromagnetic radiation from the center plane onto an image plane; and, at least one detecting element located substantially at the image plane.

2. The spectrometer of claim 1 wherein said at least one dispersive element comprises a reflective dispersive element; and, said first optical sub-system is also the second optical sub-system, acting as a dual pass optical sub-system.

3. The spectrometer of claim 2 wherein said at least one reflective dispersive element comprises a diffraction grating.

4. The spectrometer of claim 2 wherein said at least one slit element is substantially centered on an optical axis; and, said at least one detecting element is centered away from the optical axis.

5. The spectrometer of claim 2 wherein said at least one detecting element is substantially centered on an optical axis; and, said at least one slit element is displaced from the optical axis.

6. The spectrometer of claim 1 wherein said at least one dispersive element comprises a transmissive dispersive element.

7. The spectrometer of claim 1 wherein said at least one dispersive element comprises a transmissive diffraction grating.

8. The spectrometer of claim 1 wherein said at least one dispersive element comprises a volume transmission grating.

9. The spectrometer of claim 1 wherein said at least one dispersive element comprises a volume holographic transmission grating.

10. The spectrometer of claim 1 wherein said at least one dispersive element comprises two dispersive elements.

11. The spectrometer of claim 1 wherein said at least one detecting element comprises two detecting elements.

12. The spectrometer of claim 10 wherein said at least one detecting element comprises two detecting elements.

13. The spectrometer of claim 1 wherein said at least one slit element comprises two slit elements;

each one of said two slit elements being displaced from an optical axis.

14. The spectrometer of claim 13 wherein one of said two slit elements is displaced from the optical axis in an opposite direction, with respect to the optical axis, from another one of said two slit elements.

15. The spectrometer of claim 1 wherein said at least one slit element is displaced from an optical axis.

16. The spectrometer of claim 1 wherein said at least one slit element is substantially centered at an optical axis.

17. The spectrometer of claim 1 wherein said second optical sub-system is substantially symmetric to said first optical sub-system.

18. The spectrometer of claim 1 wherein said second optical sub-system is not substantially symmetric to said first optical sub-system.

19. A spectrometer comprising:

at least one slit element located at an object plane;

a first optical sub-system having at least one refractive optical element;

said first optical sub-system being capable of substantially collimating, at a center plane, electromagnetic radiation emanating from said at least one slit element;

at least one dispersive element located at substantially the center plane;

a second optical sub-system having at least one refractive optical element;

said second optical sub-system and said first optical sub-system comprising a substantially symmetrical relay system, the center plane being the plane of symmetry;

said second optical sub-system being capable of imaging the substantially collimated electromagnetic radiation from the center plane onto an image plane; and, at least one detecting element located substantially at the image plane.

20. The spectrometer of claim 19 wherein said at least one dispersive element comprises a reflective dispersive element; and, said first optical sub-system is also the second optical sub-system, acting as a dual pass optical sub-system.

21. The spectrometer of claim 20 wherein said at least one reflective dispersive element comprises a diffraction grating.

22. The spectrometer of claim 20 wherein said at least one slit element is substantially centered on an optical axis; and, said at least one detecting element is centered away from the optical axis.

23. The spectrometer of claim 20 wherein said at least one detecting element is substantially centered on an optical axis; and, said at least one slit element is displaced from the optical axis.

24. The spectrometer of claim 19 wherein said at least one dispersive element comprises a transmissive dispersive element.

25. The spectrometer of claim 19 wherein said at least one dispersive element comprises a transmissive diffraction grating.

26. The spectrometer of claim 19 wherein said at least one dispersive element comprises a volume transmission grating.

27. The spectrometer of claim 19 wherein said at least one dispersive element comprises a volume holographic transmission grating.

28. The spectrometer of claim 19 wherein said at least one dispersive element comprises two dispersive elements.

29. The spectrometer of claim 19 wherein said at least one detecting element comprises two detecting elements.

30. The spectrometer of claim 28 wherein said at least one detecting element comprises two detecting elements.

31. The spectrometer of claim 19 wherein said at least one slit element comprises two slit elements;

each one of said two slit elements being displaced from an optical axis.

32. The spectrometer of claim 31 wherein one of said two slit elements is displaced from the optical axis in an opposite direction, with respect to the optical axis, from another one of said two slit elements.

33. The spectrometer of claim 19 wherein said at least one slit element is displaced from an optical axis.

34. The spectrometer of claim 19 wherein said at least one slit element is substantially centered at an optical axis.

35. The spectrometer of claim 19 wherein said second optical sub-system is substantially symmetric to said first optical sub-system.

36. The spectrometer of claim 19 wherein said second optical sub-system is not substantially symmetric to said first optical sub-system.

37. A method for detecting wavelength dependent content of electromagnetic radiation, the method comprising the steps of:
- extracting at least one line source of electromagnetic radiation from a source of electromagnetic radiation;
- substantially collimating the electromagnetic radiation emanating from the at least one line source;
- angularly separating the substantially collimated electromagnetic radiation according to its wavelength;
- imaging the angularly separated electromagnetic radiation onto at least one detecting element;
- minimizing transverse aberrations while substantially collimating the electromagnetic radiation emanating from the at least one line source and imaging the angularly separated electromagnetic radiation; and,
- detecting the angularly separated electromagnetic radiation.

38. A spectrometer comprising:
- means for extracting at least one line source of electromagnetic radiation from a source of electromagnetic radiation;
- means for substantially collimating the electromagnetic radiation emanating from the at least one line source;
- means for angularly separating the substantially collimated electromagnetic radiation according to its wavelength;
- at least one detecting element;
- means for imaging the angularly separated electromagnetic radiation onto at least one detecting element; and,
- means for minimizing transverse aberrations while substantially collimating the electromagnetic radiation emanating from the at least one line source and imaging the angularly separated electromagnetic radiation.

39. The spectrometer of claim 38 wherein said second optical sub-system is substantially symmetric to said first optical sub-system.

40. The spectrometer of claim 38 wherein said second optical sub-system is not substantially symmetric to said first optical sub-system.

41. The spectrometer of claim 38 wherein said at least one dispersive element comprises a reflective dispersive element; and,
said means for substantially collimating are also said means for imaging, acting as dual means.

42. The spectrometer of claim 11 wherein said at least one dispersive element transmits an undispersed portion of the substantially collimated electromagnetic radiation.

43. The spectrometer of claim 42 wherein said second optical sub-system also images the undispersed portion of the substantially collimated electromagnetic radiation onto one of said two detecting elements.

44. The spectrometer of claim 29 wherein said at least one dispersive element transmits an undispersed portion of the substantially collimated electromagnetic radiation.

45. The spectrometer of claim 44 wherein said second optical sub-system also images the undispersed portion of the substantially collimated electromagnetic radiation onto one of said two detecting elements.

* * * * *